Nov. 24, 1931.    R. S. BROWN    1,833,822
AUTOMATIC CHUCKING MACHINE
Filed April 1, 1926    10 Sheets-Sheet 3
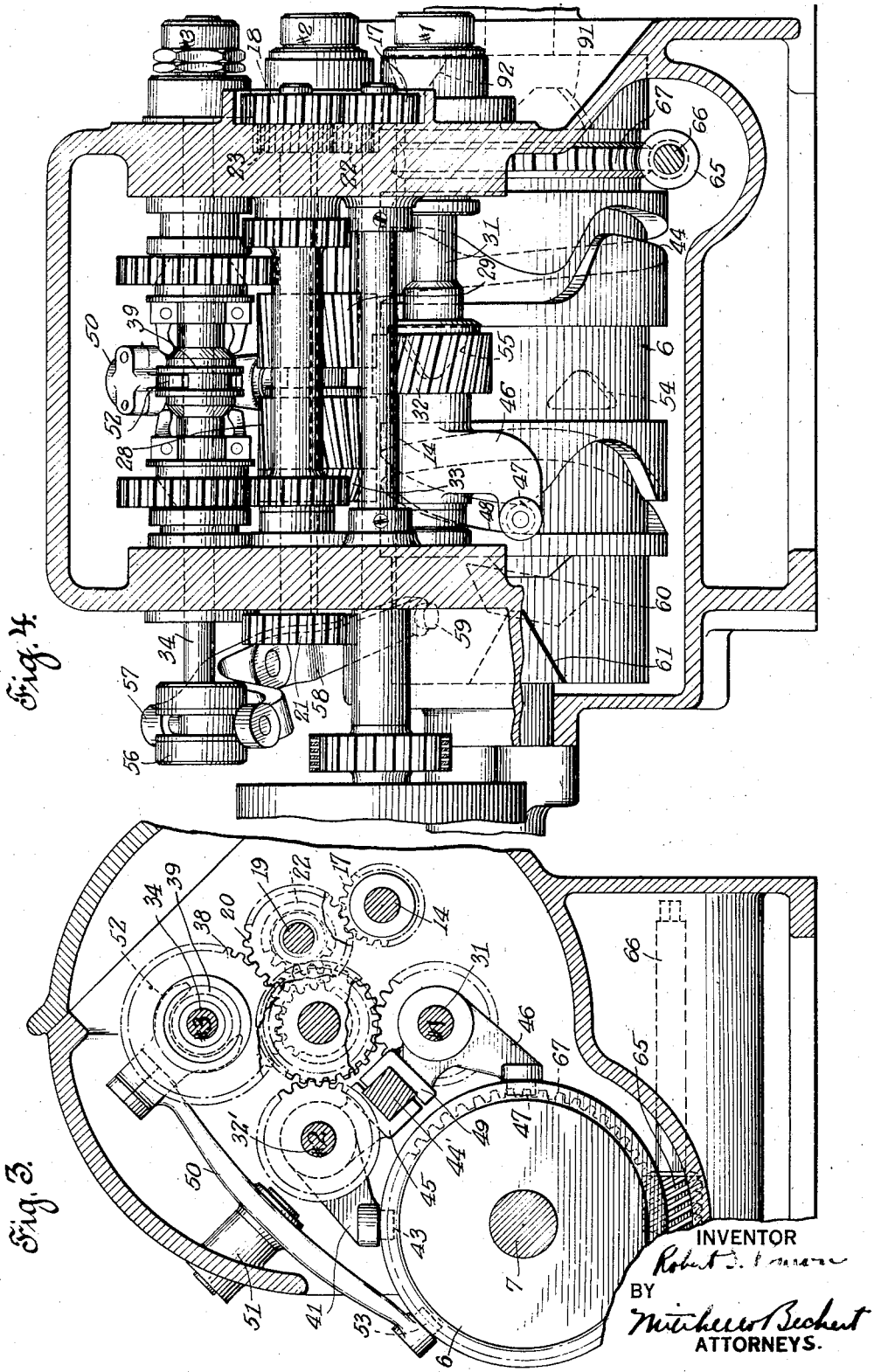

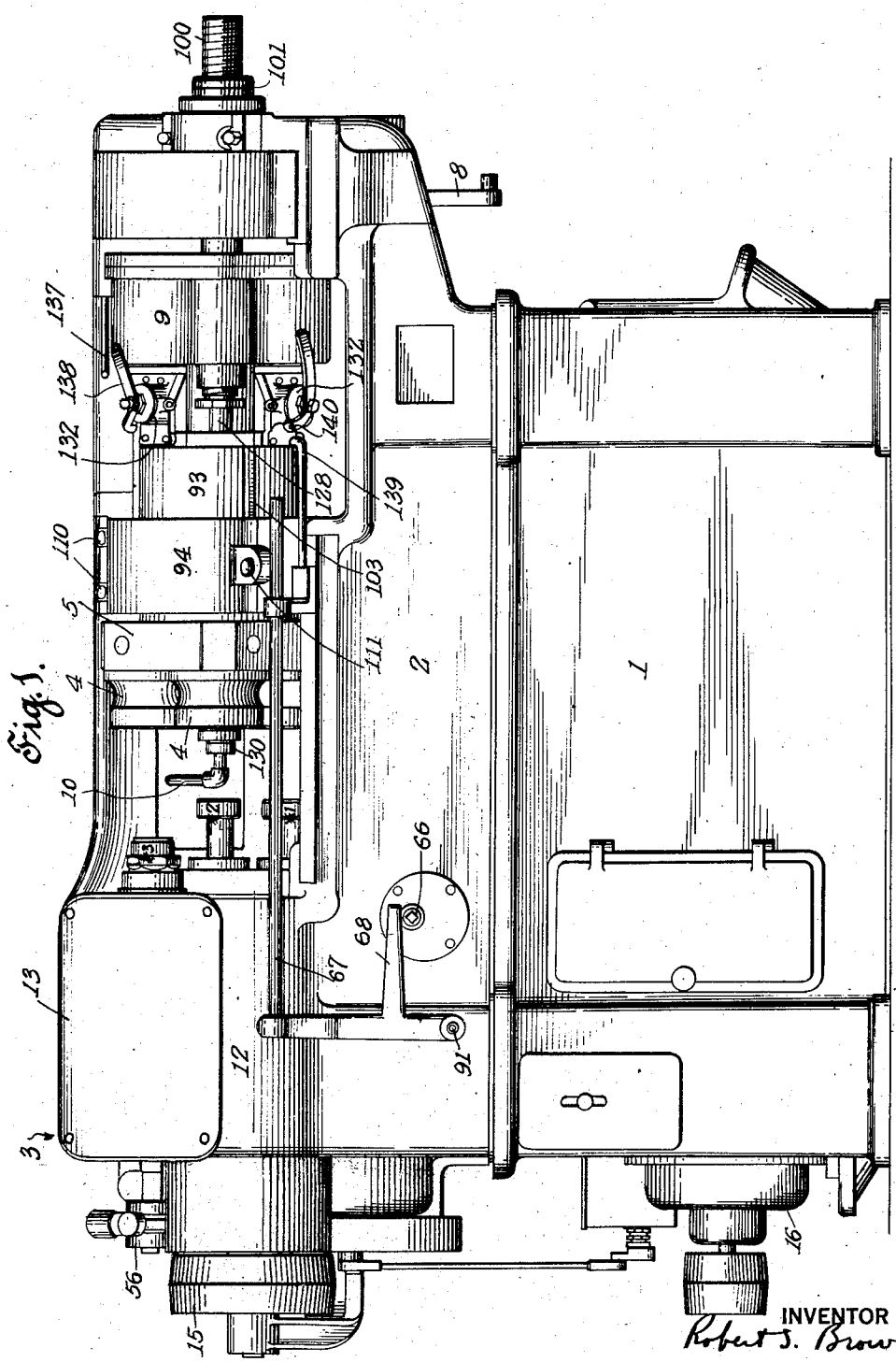

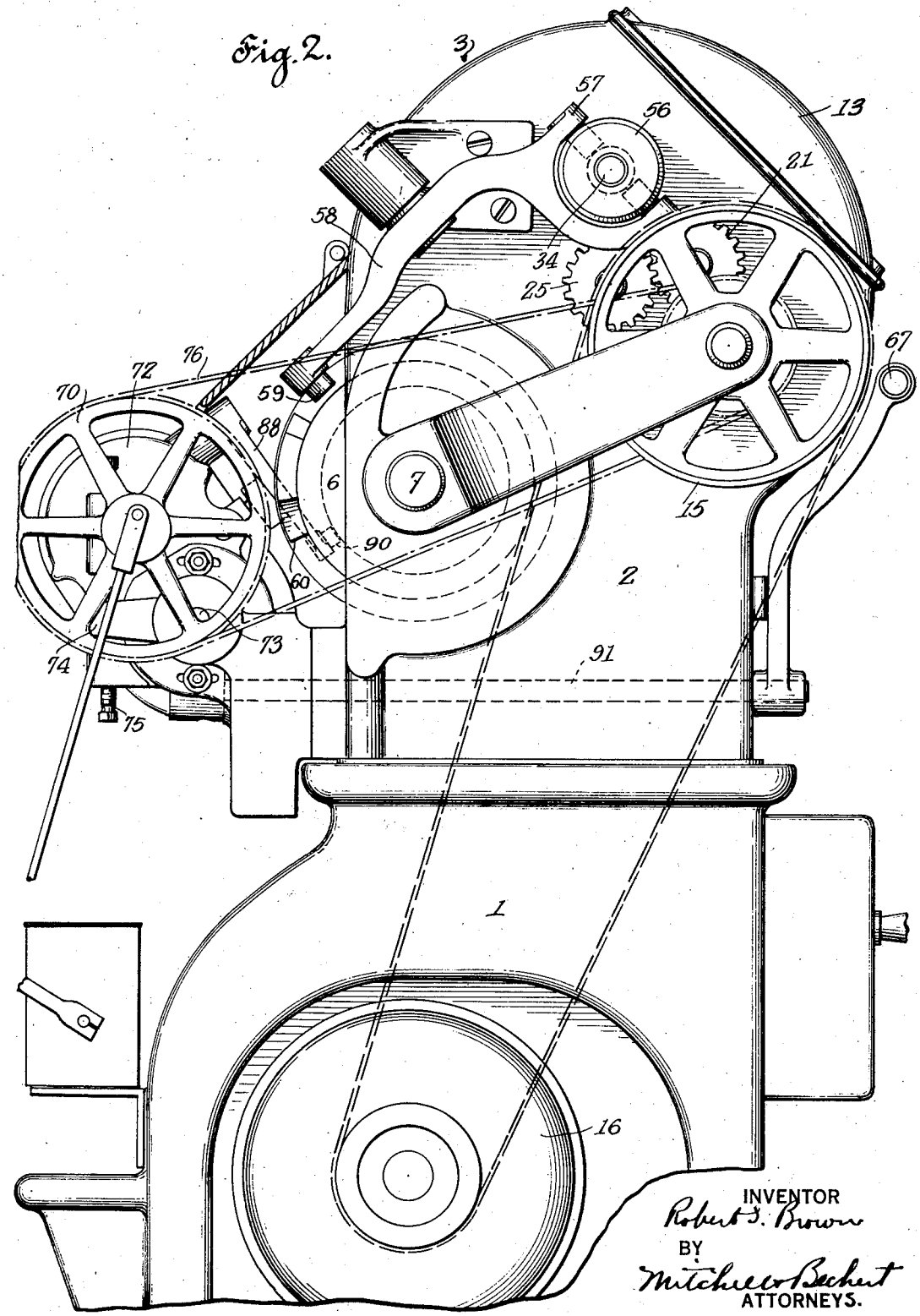

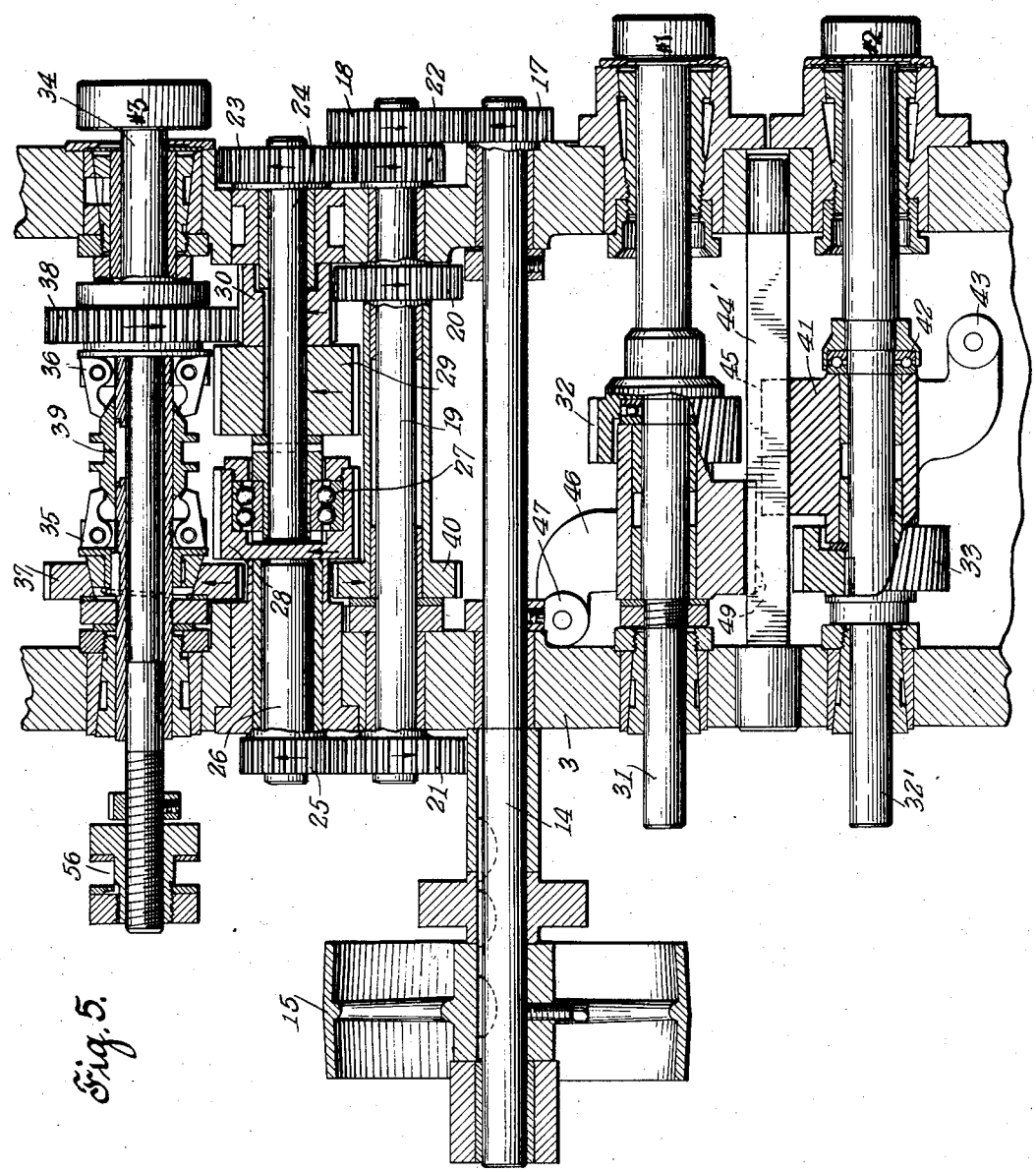

Nov. 24, 1931.  R. S. BROWN  1,833,822
AUTOMATIC CHUCKING MACHINE
Filed April 1, 1926   10 Sheets-Sheet 5
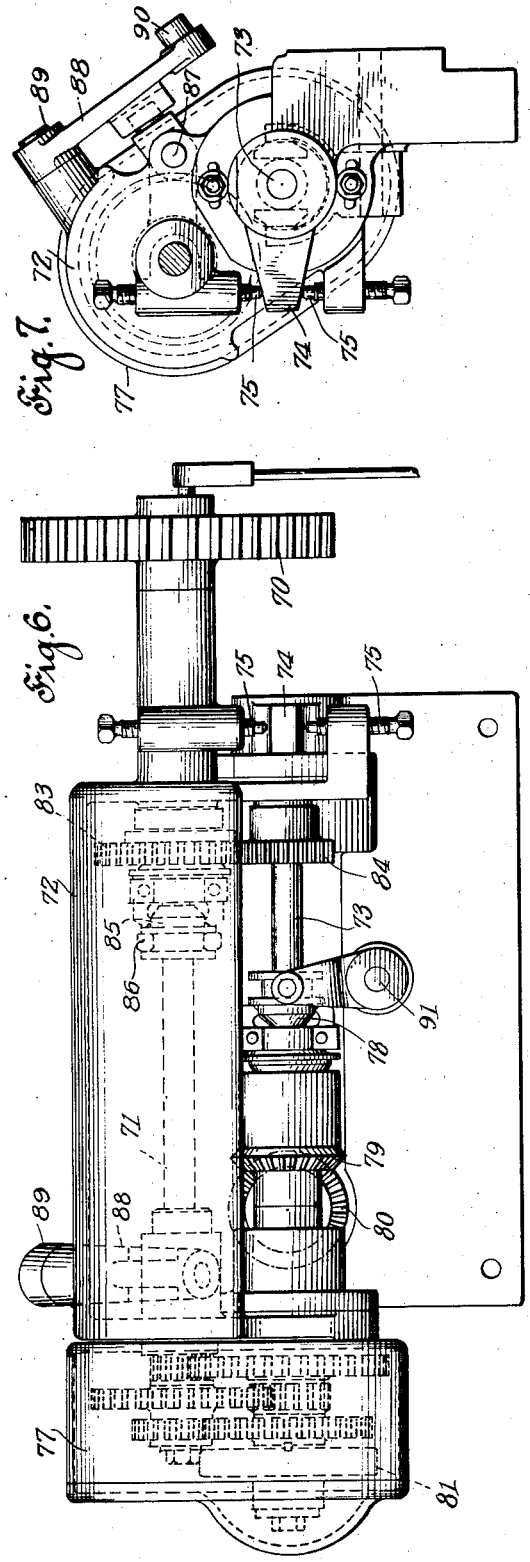
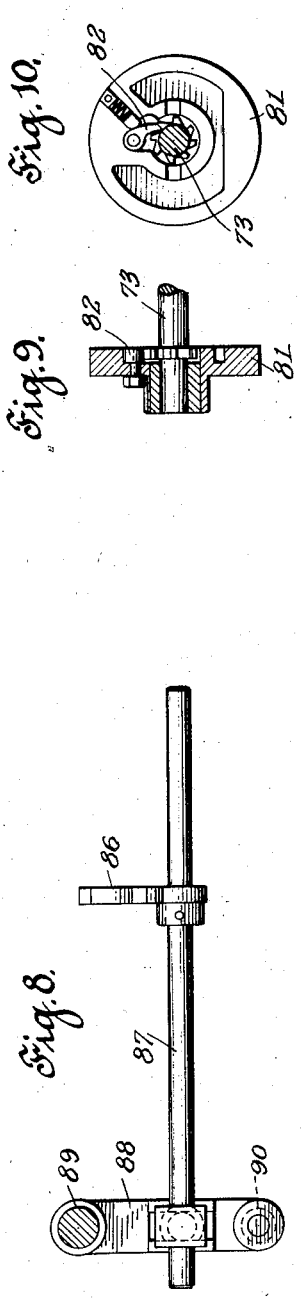
INVENTOR
Robert S. Brown
BY
Mitchell Bechtel
ATTORNEYS.

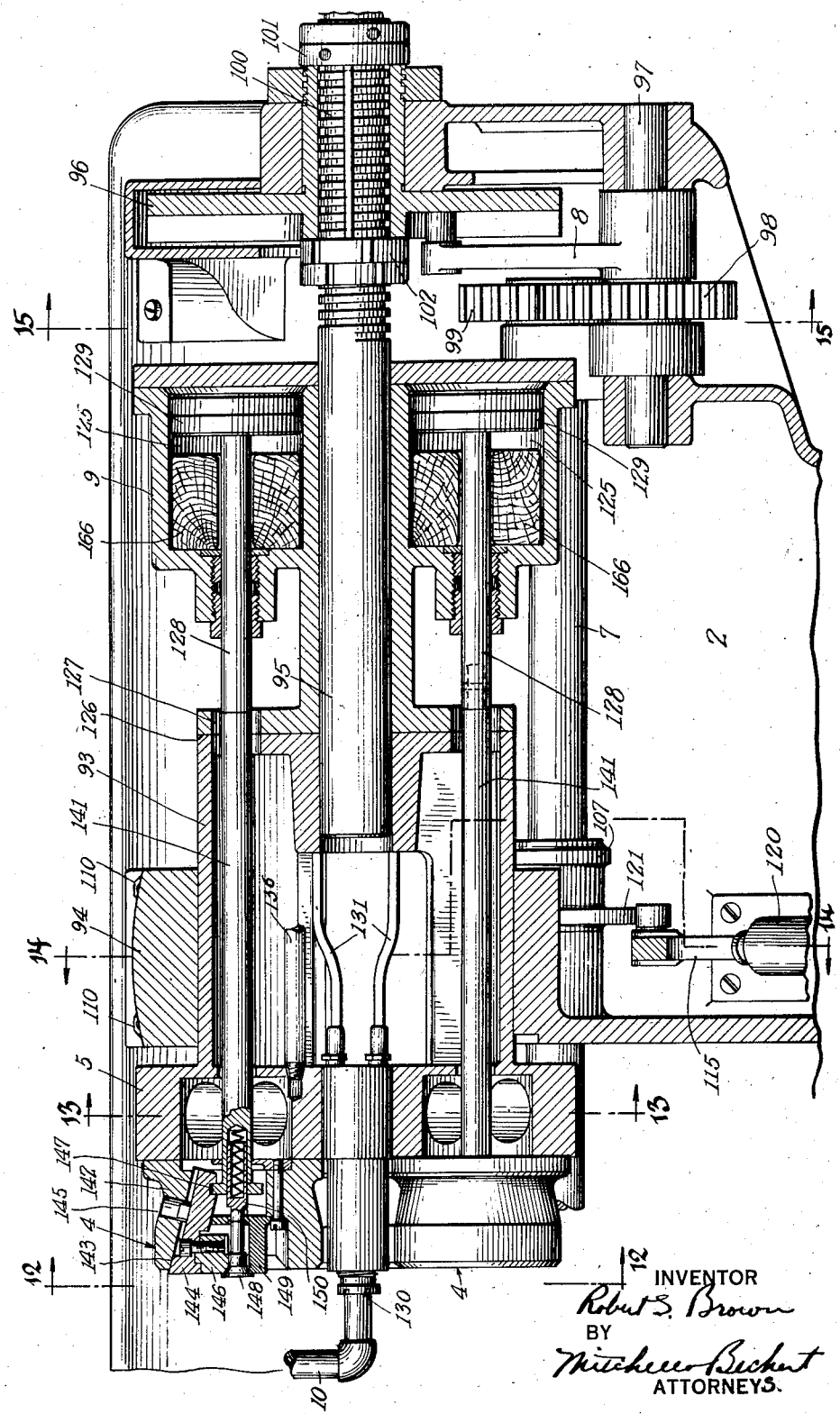

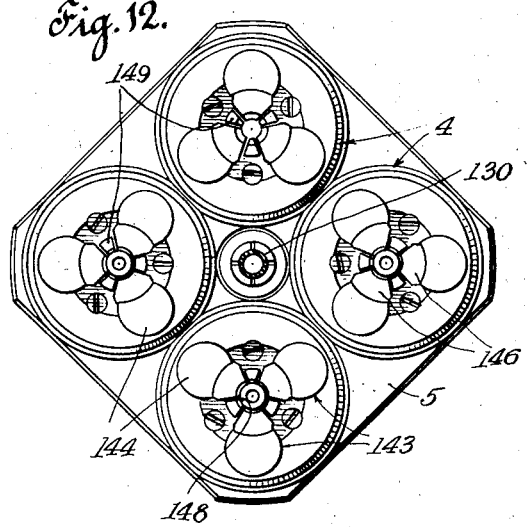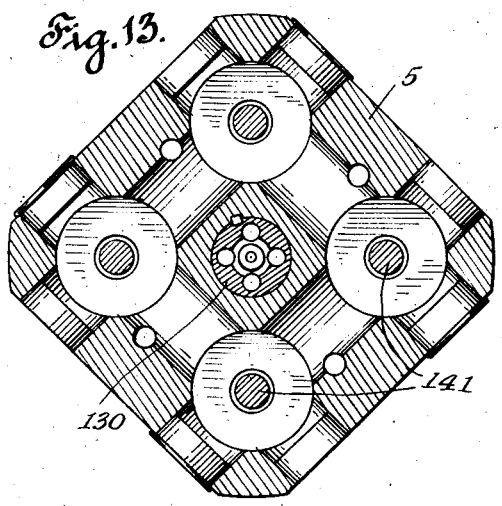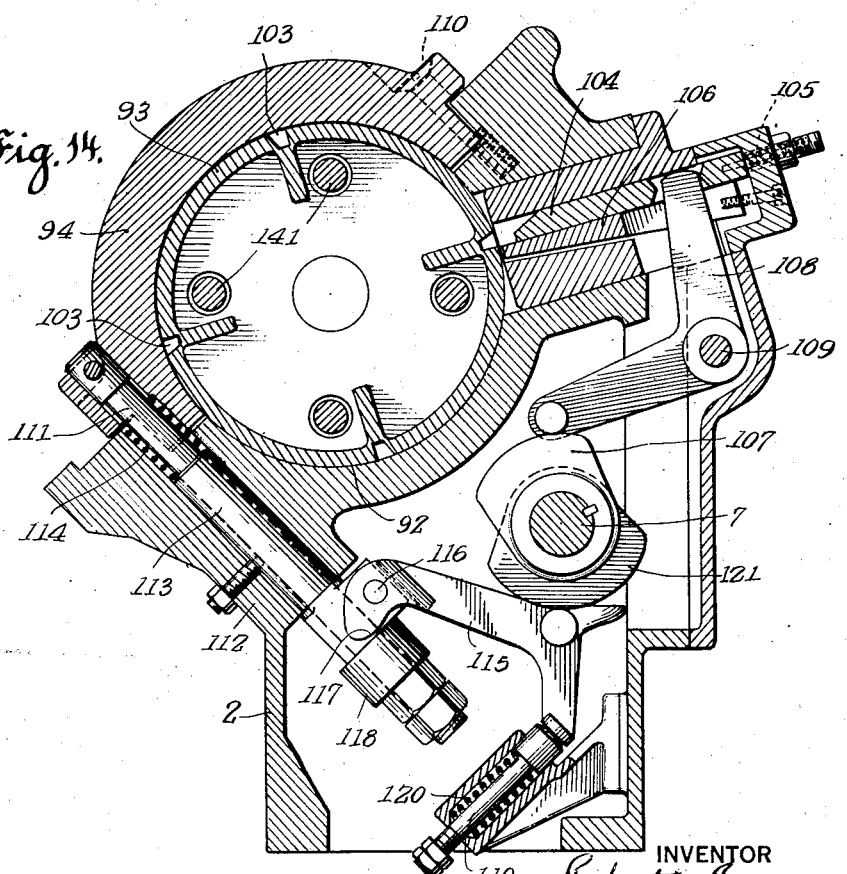

Nov. 24, 1931.    R. S. BROWN    1,833,822
AUTOMATIC CHUCKING MACHINE
Filed April 1, 1926    10 Sheets-Sheet 8
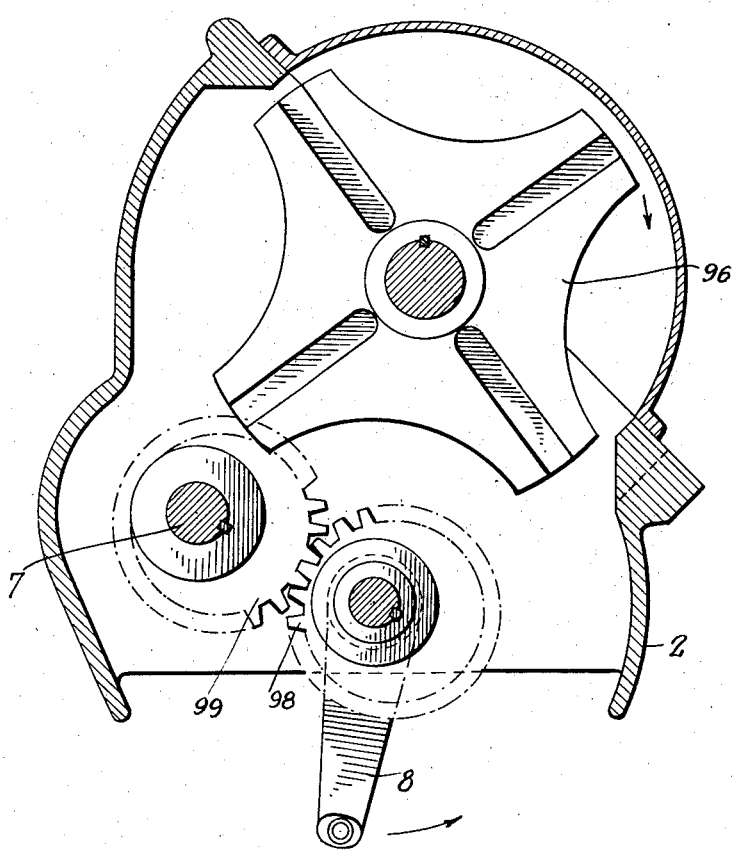
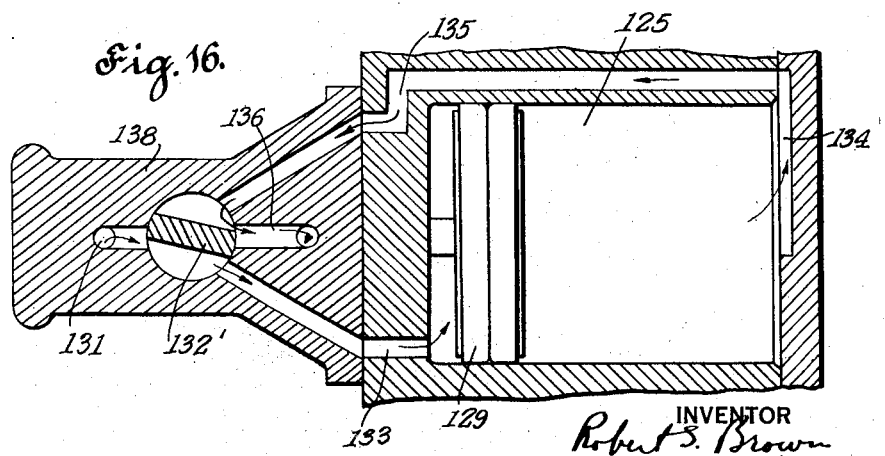

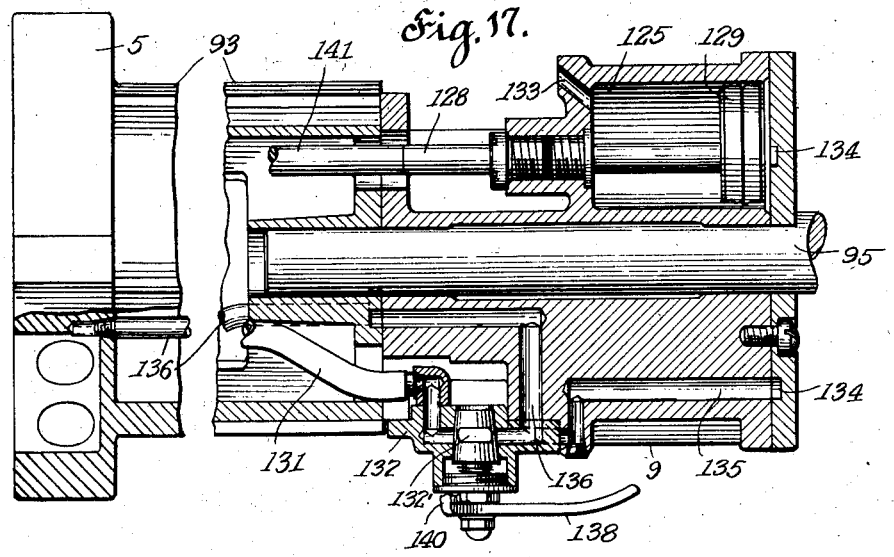
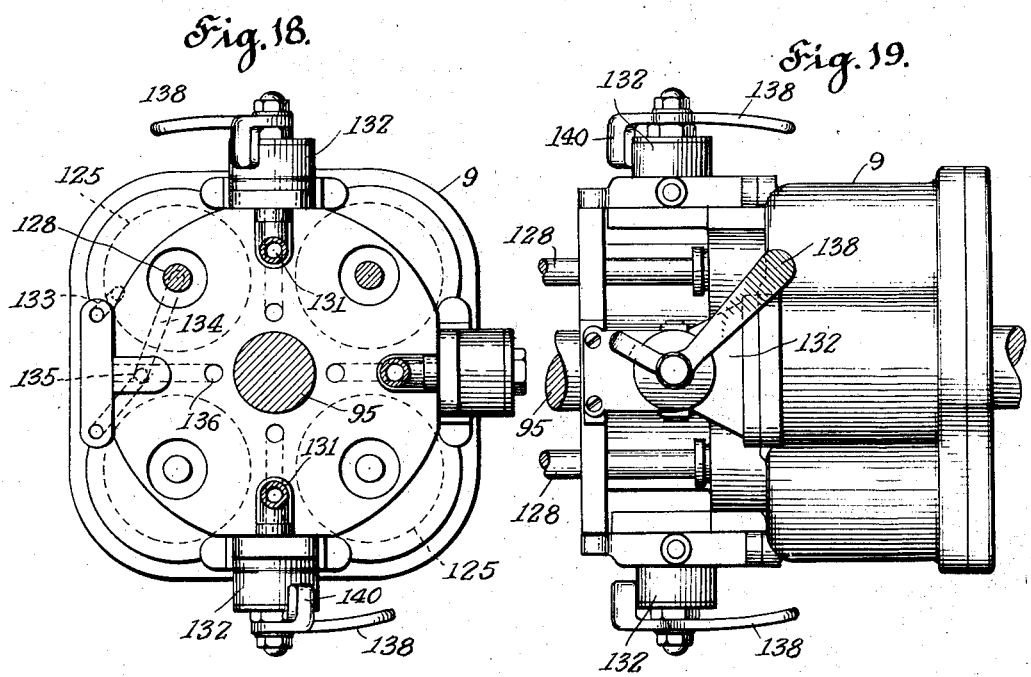

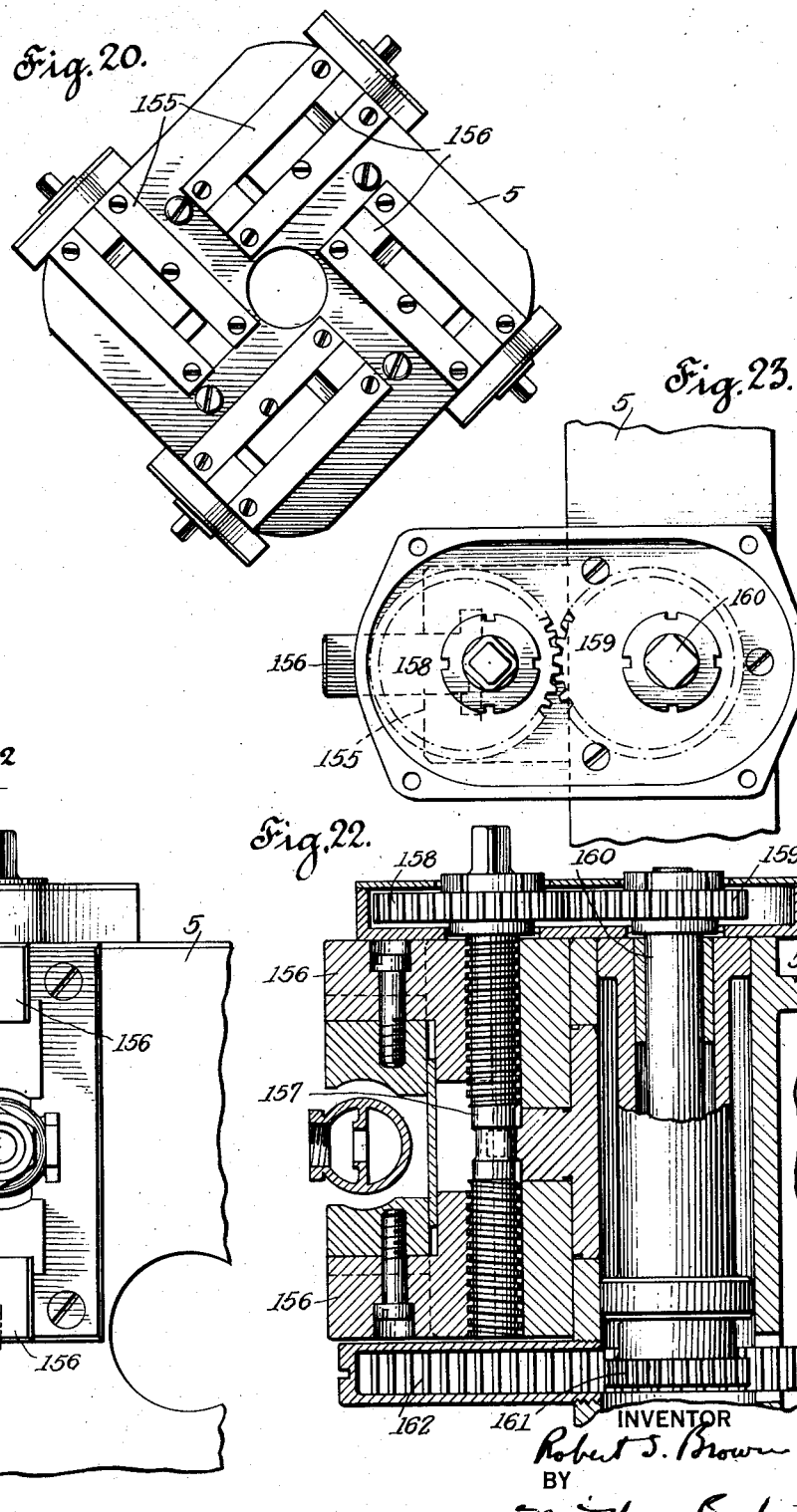

Patented Nov. 24, 1931

1,833,822

UNITED STATES PATENT OFFICE

ROBERT S. BROWN, OF NEW BRITAIN, CONNECTICUT, ASSIGNOR, BY MESNE ASSIGNMENTS, TO THE NEW BRITAIN-GRIDLEY MACHINE COMPANY, OF NEW BRITAIN, CONNECTICUT, A CORPORATION OF CONNECTICUT

AUTOMATIC CHUCKING MACHINE

Application filed April 1, 1926. Serial No. 98,974.

My invention relates to a chucking machine.

It is the general object of the invention to provide a chucking machine which will be substantially automatic in operation and which will permit work to be accurately turned out thereon at a very high rate of speed.

Among other more specific objects are to improve certain details of construction and operation, whereby the parts may be compactly arranged; to provide improved automatic chuck operating means; to provide improved means for accelerating the indexing of the machine so as to permit a relatively longer work period between successive indexing movements; to provide improved clamping means for the turret; to provide an improved chuck; and to improve details of construction to simplify and facilitate operation of certain parts, as will more fully appear.

Other objects and features of invention will be apparent upon a reading of the following specification taken in connection with the accompanying drawings.

I have chosen to illustrate the principles of my invention in connection with a chucking machine of the tool rotating and advancing type, and in which the work articles are successively indexed into position to be acted on by the tools. I do not wish to be confined in all cases to this particular type of machine, since some of the principles of my invention are of much broader application and may be embodied in other types of machines.

In said drawings showing, for illustrative purposes only, a preferred form of the invention—

Fig. 1 is a front view in elevation of a chucking machine embodying features of the invention;

Fig. 2 is an end view of the machine illustrated in Fig. 1;

Fig. 3 is an enlarged transverse sectional view of the spindle end of the machine;

Fig. 4 is a side view in partial section of parts shown in Fig. 3;

Fig. 5 is an illustrative development view of the spindles and operating mechanism therefor, the parts being relatively separated to illustrate the construction;

Fig. 6 is a view in side elevation of operating means for a cam drum;

Fig. 7 is an end view of parts shown in Fig. 6;

Fig. 8 is a detail of a clutch shaft and operating means forming part of the mechanism of Fig. 6;

Fig. 9 is a sectional view of an overrunning clutch forming part of the mechanism of Fig. 6;

Fig. 10 is an end view of the parts shown in Fig. 9;

Fig. 11 is an enlarged central sectional view of a turret and operating means in connection therewith, parts being omitted for the sake of clearness of illustration;

Fig. 12 is a view taken substantially in the plane of the line 12—12 of Fig. 11;

Fig. 13 is a sectional view taken substantially in the plane of the line 13—13 of Fig. 11;

Fig. 14 is a sectional view taken substantially in the plane of the line 14—14 of Fig. 11;

Fig. 15 is a sectional view taken substantially in the plane of the line 15—15 of Fig. 11;

Fig. 16 is a sectional, partially diagrammatic, view of part of a chuck operating means;

Fig. 17 is a sectional view of parts of the chuck operating means shown in Fig. 11;

Fig. 18 is an end view of parts of the chuck operating means shown in Fig. 17;

Fig. 19 is a view in side elevation of parts shown in Fig. 18;

Fig. 20 is a view in end elevation of an improved form of chuck;

Fig. 21 is an enlarged fragmentary view of parts shown in Fig. 20 and illustrating a work article in place;

Fig. 22 is a sectional view taken substantially in the plane of the line 22—22 of Fig. 21;

Fig. 23 is a top plan view of parts shown in Fig. 22, the cover plate being removed to illustrate the interior construction.

The general construction and operation of the machine will first be described briefly, after which various features will be set forth in greater detail.

The operative parts of the machine may be supported upon a suitable frame 1 sustaining a bed 2, which latter supports the operative parts. The spindle end of the machine, designated generally 3 (Fig. 1), embodies a plurality of accurately spaced tool spindles which, in the preferred form, are rotatable and movable axially to engage the work articles carried in chucks 4—4 which, in turn, are carried upon a turret 5. The chucks are accurately spaced so as to come in exact alignment with the tool spindles.

At the rear side of the machine is a cam drum 6 (Figs. 2, 3 and 14) mounted upon a main cam shaft 7, which extends lengthwise of the machine and actuates means, such as a Geneva arm 8, for indexing the turret 5 to various positions step by step, whereby the work articles carried in the chucks 4—4 may be presented successively to tools carried by the tool spindles hereinbefore noted. The turret, in addition to carrying the chucks 4—4, preferably carries means for operating these chucks, and in the illustrative form I show a cylinder block 9, having means therein to actuate the chucks. A suitable fluid, such as compressed air, may be led to the cylinder block 9 through a pipe 10. The chucks are preferably automatically opened when the necessary operations have been performed on the work articles carried by the chucks, and the work articles are then permitted to fall out into a suitable chute or hopper in the machine. A new work article is then entered into the chuck, after which the chuck may be either manually or automatically closed for gripping the work article and holding the same during the time it is acted on by the various tools, and holding the same until the work thereon is completed.

The bed or frame of the machine is preferably formed with the open side extending at a downwardly directed angle, as shown, so that the work articles may be readily placed in the chucks and the operation of the machine may be watched by an operator while seated. The bed is preferably recessed or cut back at the front so as to provide sufficient space for a man to be comfortably seated, and to locate the chucks closer to the front of the machine to facilitate placing work articles therein when it is desired to place the same by hand. Such being the general nature of the machine, various details will now be described.

Considering now the spindle end of the machine, particular attention is directed to Figs. 1 to 5. The spindle end includes a housing 12, and a cover 13 serves to close an opening providing for access to the interior of the housing. A main drive shaft 14 is journaled in suitable bearings in the housing and may be driven by means, such as the pulley 15, which may be belt driven from the motor 16 or from any other suitable source of power. A driving pinion 17 is secured on the main drive shaft 14 and meshes with a gear 18, carried by what I may term an intermediate shaft 19, journaled in the housing. The intermediate shaft carries gears 18, 22, 21 thereon, for the purpose to be described. The gear 22 is secured on the shaft 19 and meshes with a gear 23 carried by a shaft 24, journaled at one end in the housing 12. The gear 21 on the opposite end of the shaft 19 meshes with a gear 25 carried by a shaft 26 journaled in a relatively long bearing in the housing. The shafts 24—26 are in axial alignment with each other, and I prefer to journal the inner end of the shaft 24 on the inner end of the shaft 26. For this purpose I provide an anti-friction bearing 27, as shown. The two shafts 24—26, since they are in axial alignment with each other and both serve to rotate spindles, as will be later described, may be referred to as a central drive shaft, and will be so referred to hereinafter. The inner end of the shaft 26 carries a relatively wide gear 28 and, in the form shown, the anti-friction bearing 27 is mounted in a recess in this gear. The shaft 24 carries within the housing a gear 29, which may be the same or similar to the gear 28. Since, as shown, the two gears 28—29 rotate in the same direction, it would be possible to mount both gears on a single unitary shaft, but, in that case, both gears would have to rotate at the same angular velocity. By dividing the center drive shaft 24—26 into two relatively rotatable parts, it is possible to secure different rates of speed on the two gears 28—29. The shaft 24 also carries a gear 30, fixed thereto, which meshes with the gear 20 of the loosely mounted pair of gears 20—40 on the intermediate shaft 19.

The total spindle 31 is journaled in the housing 12 and is adapted for slidable movement so as to permit advancing and retracting of the spindle. A gear 32 is secured on the tool spindle 31 and meshes with the gear 29 carried by the part 24 of the center drive shaft. In the preferred form the gears 29—32 have spirally arranged teeth thereon, with the spirals arranged to constantly urge the spindle 31 into retracted position, that is, toward the left as viewed in Figs. 4 and 5. The spindle 31 may be referred to as No. 1 spindle.

A second tool spindle 32', which may be referred to as No. 2 spindle, is rotatably and slidably mounted in the housing 12 and carries a gear 33, similar to the gear 32 carried by the No. 1 spindle. The gear 33 meshes with gear 28 carried by a part 26 of the center drive shaft. The gears 28—33 are also preferably spiral gears with the spirals directed so as to constantly urge the spindle 32' into retracted position, that is, toward the left as viewed in Figs. 4 and 5. It may be here stated that the No. 1 spindle and the No. 2 spindle will ordinarily carry boring and turning tools, while the No. 3 spindle, designated 34 in the drawings, may be provided with means for threading a work article.

The No. 3 spindle 34 is rotatably and slidably mounted in the housing 12 and carries two clutches 35—36. The spindle 34 also carries two gears 37—38, which are both loosely mounted thereon, but either gear may be caused to rotate the spindle through either the clutch 35 or the clutch 36. A shift sleeve 39 is mounted between the two clutches 35—36 and serves to throw either clutch into action to cause the spindle 34 to rotate with either the gear 37 or the gear 38. The gear 38 meshes with the drive gear 30 carried by the center drive shaft portion 24, while the gear 37 meshes with the gear 40 loosely mounted on the intermediate shaft 19 and connected to gear 20 by a quill, the gear 20 being in mesh with and driven by gear 30. From the directions of rotation indicated by the arrows in Fig. 5 it will be seen that when the clutch 36 is actuated to cause the gear 38 to rotate with the spindle, the direction of rotation will be clockwise, as viewed from the left in Fig. 5, while with the gear 37 clutched to the shaft 34, the rotation of the shaft will be in a counter-clockwise direction as viewed from the left. Therefore, the spindle 34 is well adapted to receive a threading tool, since the shaft may be rotated in either direction.

In order to change the speed of rotation of the various spindles, it is not necessary to change any gears within the housing but, as will be clear, particularly from Figs. 2, 4 and 5, the gears 17, 18, 22, 23 at one end of the housing, as well as the gears 21—25 at the other end of the housing, may be removed and different gears put in their places, so as to vary the speeds of rotation of the various spindles at will, within the range of the gears provided. The gears last mentioned are arranged to be easily applied and removed from their respective shafts, so as to render speed changes a simple matter. As heretofore stated, by providing a divided central drive shaft, different speeds may be imparted to the spindles 31—32', and this without the necessity of a different or separate shaft within the housing. The divided center drive shaft, therefore, permits a very compact arrangement.

As above noted, the machine has been illustrated as one in which the tool spindles are advanced to meet and act upon the work articles carried by a turret. The tool spindles are advanced preferably by means of cams mounted on the cam drum 6 carried by the main cam shaft 7. This shaft 7 may be at the rear side of the machine and preferably extends through a major portion of the length thereof. In the form shown, the spindle 32' has a cam yoke 41 mounted thereon, and this yoke may bear against an anti-friction thrust bearing 42 interposed between the spindle and the yoke. The yoke 41 may carry a cam roller 43 for engagement with a cam 44 mounted on the cam drum 6. In order to properly guide the cam yoke, I may provide a cam yoke guide bar 44', mounted in the housing 12. This guide bar may be of angular form to receive a correspondingly shaped slot or fork 45 on the yoke 41. Upon rotation of the cam drum 6, the cam 44 will act upon the roller 43 so as to slide the yoke 41 along the guide bar 44 and, in so moving, the yoke 41 will act through the thrust bearing 42 to advance the spindle 32'. The speed of advance as well as the extent thereof may be determined by the particular form and extent of the cam 44 carried by the cam drum 6. Obviously, the cam may be and preferably is so formed as to retract the spindle 32' after it has performed its function. The spiral gear 33 and its meshing gear 28, however, are preferably arranged, as above stated, so as to constantly urge the spindle 32' toward retracted position, and this urging of the spindle causes the cam roller 43 to be always held against the cam or in position to be engaged thereby. One or both of the meshing spiral gears has a wide face, so as to assure a proper drive for the spindle throughout its longitudinal travel.

The No. 1 spindle, designated 31, may be moved by means of the cam yoke 46, which may act through a thrust bearing on the spindle 31 to advance and retract the same in a manner similar to that described in connection with the spindle 32'. The cam yoke 46 may have a roller 47 to engage the cam 48 for the purpose of moving the spindle. The yoke 46 may have a part 49 to fit upon the guide bar 44, so as to properly support and guide the yoke.

The No. 3 spindle 34 is rotated in either direction, as above described, depending upon which of the clutches 35—36 is thrown into action. The clutch lever 50 (Fig. 3) may be pivoted on the housing 12, as indicated at 51. One end of this lever is provided with a yoke 52, engaging the shift sleeve 39 between the two clutches 35—36. The opposite end of the clutch lever 50 has a pin or roller 53, which may be engaged by cams, such as 54—55 (Fig. 4), carried by the cam drum. Obviously, one of these cams will throw in one clutch while the other clutch will actuate the lever 50 so as to throw in the opposite clutch. The cams 54—55 are therefore placed at the proper circumferential positions on the cam drum, so that the No. 3 spindle will be rotated in the proper direction, depending upon the direction in which it is being moved axially. The rear end of the No. 3 spindle 34 may have a collar 56 for receiving the fork 57 (Fig. 4) carried on the lever 58. The lever 58 carries at the opposite end a pin or roller 59 for engagement with suitably placed cams, such as 60—61. These cams may be and preferably are rather short, so that when the No. 3 spindle is to be advanced, the cam 60, for example, advances the same at the proper rate to cause the device, such as a tap or die, to advance to the work article at the proper rate, after which the tap or die may feed itself into the work. When the proper threading operation has been performed, the direction of rotation of the No. 3 spindle is reversed by the means heretofore described, and the spindle may be partly withdrawn by reason of the threading tool itself. The final withdrawal of the No. 3 spindle, however, may be accomplished by the other cam, such as 61, to withdraw the spindle back to its original or starting position.

Obviously, by means heretofore described, the rates of rotation may be substantially varied by changing the change speed gears. The rates of advance and retraction of the spindles may be varied by varying the extent and inclination of the various cams acting upon the arms or levers for advancing and retracting the spindles. The cam drum is preferably arranged so that built up cams of the desired configuration and extent may be readily put on and held in place. Such cam drums and cams, however, are well known in the art and need no detailed explanation.

The cam drum 6 is rotated in its bearings in the frame of the machine and, in the form shown, I rotate the same by means of a worm 65 on a shaft 66. The worm 65 meshes with a worm gear 67 carried by the cam drum or shaft. The worm shaft 66 may extend to the front of the machine, as shown particularly in Figs. 1 and 3, where a suitable operating handle may be engaged therewith so as to turn the drum over by hand for setting up for a new class of work in the machine. The cam drum, however, is normally power driven by means to be hereinafter described, and the power driven means may be controlled by a lever mechanism 67 located at the front of the machine. The control lever mechanism may have means, such as an arm 68, to shield the end of the shaft 66 and prevent hand operation when the power driven mechanism is on. When the control mechanism 67 is in the position shown in Fig. 1, it is obvious that the end of the shaft 66 is uncovered and may be actuated by hand.

Now, referring particularly to Fig. 6, which illustrates a part of the power driven mechanism for the cam drum, it will be seen that there is a gear 70 carried on the shaft 71, journaled in a housing 72, which is pivotally mounted on the frame about the axis of the shaft 73. The frame has a stationary abutment 74 (Fig. 7), to be engaged by adjusting screws 75—75 on the housing 72, as shown, whereby the position of the housing and associated parts may be varied. The gear and connected shaft 71 may be driven by a chain 76 (Fig. 2), and it is for the purpose of keeping this chain taut that the adjustment and pivotal mounting just described is provided.

The shaft 71 may pass through the housing 72 and into a gear casing 77 where, through suitable meshing gears, power is transmitted to the shaft 73. The shaft 73 carries a clutch mechanism 78, for clutching the bevel gear 79 thereto and causing the bevel gear to rotate with the shaft. The bevel gear in turn meshes with a bevel gear 80 carried by the worm shaft 66, which in turn rotates the cam drum, as previously described. During the rotation of the cam drum, while the latter is feeding the tool spindles to the work, it is desirable that the drum rotate at a relatively slow speed so that the tools carried by the spindles may properly perform their functions. However, when the work spindles are not actively engaged, it is desirable to rotate the cam drum at a relatively higher rate of speed for the reason that the cam shaft connected to the drum in the present instance serves to index the turret carrying the work articles, and the quicker the turret can be indexed, the longer will be the permissible period for performing the operations on the work articles. I have therefore provided means for speeding up the rotation of the cam drum when the tools carried by the tool spindles have been retracted from the work articles. For accomplishing this result I may employ an overrunning ratchet or clutch designated 81 (Figs. 6, 9 and 10). In the form shown, the shaft 73 carries ratchet teeth, while a spring pressed pawl 82 carried by the housing 81 may engage the teeth. During the slow movement of the cam drum power from the shaft 71 is transmitted through the gearing in case 77 to that part of the ratchet 81 carrying the pawl. The pawl, therefore, drives the shaft 73. It is therefore possible to permit the gearing in the gear casing 77 to remain in mesh and to drive the ratchet 81 at a constant speed, and still speed up the rotation of the shaft 73, and consequently the cam drum, without disturbing any of the gearing. As one means of accomplishing this result, I employ a gear 83 on the shaft 71, this gear being normally loose or idle on the shaft. A gear 84 on the shaft 73 meshes with the gear 83 and, during the normal rotation of the cam drum, the gear 84 of course drives the gear 83 idly. The gear 83 is arranged to be clutched to the shaft 71 by means of a clutch 85, movable by a fork 86, which in turn is moved by a shaft or rod 87 connected to a cam yoke 88 pivoted to the housing at 89. The cam yoke has a pin or roller 90 thereon, which is adapted to be engaged by cam members such as 91—92 (Fig. 4). When the pin or roller 90 is engaged by the proper cam, the clutch 85 is thrown in so as to clutch the gear 83 onto the shaft 71. The gear 83 then becomes a driver for the gear 84 which latter, being fixed to the shaft 73, will drive the bevel gears 79—80, and consequently the cam drum, at a relatively higher speed (due to the proportioning of the gears) than the drum is driven by the gearing in the gear casing 77, and obviously the ratchet teeth run past the pawl 82. During this relatively faster rotation of the cam drum the tool spindles are out of active position, and it is during this relatively fast rotation that the turret is indexed, as will be later described. When the other cam 91—92 engages the lever 88, the gear 83 will be released from the shaft 71, and the normal rotation of the cam drum again follows. It may be here stated that the lever mechanism 67 (Fig. 1) acts through a shaft 91 and the clutch 78 to cause the power shaft 73 to be either clutched or unclutched from the bevel gear 79.

As previously stated, the cam shaft 7 preferably extends along the rear side of the machine frame and is arranged to actuate means for indexing the turret 5. In the form shown the machine frame is provided with a relatively large bearing 92 (Fig. 14) for receiving a hollow bearing portion 93 of the turret 5. A turret clamping cap 94 is arranged to form the remainder of the turret bearing and also to clamp the turret in indexed position, as will be later described. It will be observed that the turret bearing is formed on the downwardly inclined angle toward the front, thus conforming to the generally inclined open portion of the main frame. The turret 5 may carry a shaft 95 (Fig. 11), which extends to the end of the frame and is journaled therein in a suitable bearing. In the form shown the shaft 95 is acted upon by means for rotating the turret for indexing the same step by step. A convenient and serviceable means for indexing the turret includes, in the preferred form, a Geneva gear and operating arm (Figs. 11 and 15). In the illustrative machine here disclosed I employ three tool spindles and four chucks (one chuck always being either empty or in the act of discharging or filling), and therefore employ a four-arm Geneva wheel 96. The Geneva wheel is slidably but non-rotatably mounted on the shaft 95, while the Geneva arm 8 may be mounted on a shaft 97 on the frame. Now, since the turret and various associated mechanisms to be hereinafter described represent a considerable mass of metal, it is desirable that the acceleration of the indexing movement be not too rapid. The characteristics of the Geneva motion, of course, indicate that when the Geneva arm engages the wheel near the center the motion of the wheel is very rapid. I therefore employ means to decrease the acceleration of the Geneva wheel while still maintaining the desirable features of such a transmission mechanism. In the form shown, I secure an elliptical gear 98 to the Geneva arm or Geneva arm shaft 97, and a meshing elliptical gear 99 is secured upon the main cam shaft 7. The elliptical gears are so proportioned and arranged that when the Geneva arm engages the Geneva wheel closest the center, the rotative motion transmitted to the Geneva arm by the main cam shaft 7 will be the slowest. The simple means thus provided serves to decrease the acceleration and deceleration of the heavy mass of metal and to flatten out substantially the curve representing the angular speed of a Geneva wheel of the usual characteristics.

In the form shown, the rear end of the shaft 95 is threaded, as indicated at 100, and suitable means, such as nuts 101—102, may be provided for positioning the shaft 95 longitudinally of the main machine frame. It is of course understood that the Geneva wheel 96 is splined or otherwise secured to the shaft 95, so as to permit sliding movement, but to prevent relative rotation between these elements. By means of the nuts 101—102 it is possible to position the turret 5 very accurately relatively to the remaining parts of the mechanism, and this is of great importance with certain types of work, in order that holes drilled or other operations performed on the work articles be definitely limited.

Now, it will be plain that, with the four-slot Geneva wheel, the turret will be indexed one-fourth of a revolution for each revolution of the Geneva arm. However, in order to accurately hold and index the turret exactly 90 degrees, I employ additional means. The turret 5 is provided in this instance with four longitudinal slots 103—103 (Fig. 14), accurately positioned 90 degrees apart. These slots are preferably radial at one side and inclined at the opposite side. A locking bar 104, shaped to fit the slots 103—103, is slidably positioned on the main frame of the machine and, in the form shown, is resiliently urged inwardly into the locking position by means of a spring 105. The locking bar 104 is accurately positioned and held in the required position by suitable means, such as an adjustable wedge 106. When the turret has been indexed substantially 90 degrees, the locking bar 104 is caused to descend into the appropriate slot 103, and thus definitely holds the turret in indexed position. The locking bar is removed from the appropriate slot 103 when it is desired to index the turret and, in the preferred form shown, the locking bar is positively raised out of the slot but is resiliently forced into the slot so that danger of breakage or injury to any parts is minimized. The means selected for positively raising the locking bar from the slot is a cam 107 carried by the main cam shaft 7 and acting upon a bell crank lever 108 journaled on the frame at 109. One end of the lever 108 engages the locking bar 104, as by passing through a slot in the bar. Obviously, when the cam 107 is rotated into position so as to elevate one end of the lever 108, the opposite end of the lever positively withdraws the locking bar from the slot. When the cam 107 is rotated to such a position that it no longer engages the bell crank 108, the locking bar 104 is free to descend under the influence of the spring 105.

Now, while the locking bar 104 serves to very accurately position the turret, it is desirable to employ additional means for rigidly clamping the turret when once it has arrived at the proper indexed position, thus relieving strain on the end positioning units 101, 102 and holding the work articles rigidly while being acted on by the tools. The turret clamping cap 94 is secured to the main frame at two spaced points 110—110. At the opposite side the cap is arranged to be drawn up on the turret at a single point, thus giving what may be termed a three-point support to the clamping cap and assuring a tight clamping action. The two point support may be in the form of screws, as shown, which may be passed through the clamping cap with a relatively loose fit so as to permit the very slight pivotal action necessary for opening and closing the clamping cap, while the means for drawing down the clamping cap may be in the form of automatically actuated means, to be now described. A rod 111 is secured to the cap 84 and passes through a part 112 of the frame. If desired, a sleeve 113 may be held in the bore of the frame through which the draw rod 111 extends and be held in place, as by a set screw. A compression spring 114 is located between the end of the sleeve 113 and the clamping cap, so that when any pull on the rod 111 is released, the compression spring 114 will move the clamping cap 94 to the unclamped position, so that the turret may be rotated. Obviously, when a pull is exerted on the draw rod 114, the clamping cap is drawn down into tight engagement with the turret and the latter is securely clamped against rotation. I preferably employ resilient means for drawing the clamping cap into clamped position. In the form shown a lever 115 is pivoted at 116 to a stationary part, as the sleeve 113, and has an arm 117 in engagement with the nut or abutment 118 carried by the draw rod 111. The opposite end of the lever is engaged by a push rod 119, urged outwardly by means of a spring 120. Obviously, then, when the push rod 119 is free to act, the lever 115 will be swung so as to exert a pull on the draw rod 111; and thus clamp the clamping cap 94 onto the turret for holding the same in place. I prefer to employ positive means for opening the clamp or for so controlling parts as to permit the clamp to be opened by resilient means. In the form shown a cam 121 on the cam shaft 7 is arranged to engage the lever 115 and to force the push rod 119 against the tension of its spring 120. The arm 117 on the lever 115 is then raised away from the abutment and the spring 114 then raises the clamping cap to the unclamped position. As soon as the cam 121 passes out of engagement with the lever 115, the spring 120, acting on the push rod, causes the clamp to be set. It will be understood that the spring 120 is of sufficient strength, acting through the necessary levers, to overcome the positively acting spring 114 and to cause the clamping cap to hold with the desired degree of firmness. As shown particularly in Fig. 14, the cam 121 is of greater extent than the cam 107, so that the clamping cap 94 remains in unclamped position until the locking bar 104 is definitely in place, after which the clamping cap is moved to clamping position. The cam 121 again permits the clamping cap to be unclamped before the locking bar is removed from its appropriate slot 103. Now, it will be plain that during the rotation of the main cam shaft 7 the clamping cap is released and the Geneva mechanism is then caused to rotate the turret to approximately the desired extent, after which the locking bar 104 will be caused to enter one of the slots 103 in the turret to accurately position the latter, after which the clamping cap 94 is drawn down so as to positively clamp the turret in indexed position.

As previously indicated, the work articles are held in suitable chucks, such as 4—4, carried by the turret. While the chucks may be manually operated, it is desirable to provide automatic means for operating the same so as to cut down the time of the chucking operation, as well as to relieve the operator of undue fatigue. The automatic means may assume various forms, but I have chosen for illustration a form which has proved satisfactory in commercial use.

In the form shown I employ fluid (preferably air) actuating means for the chucks. There is preferably an air cylinder and actuating piston provided for each chuck on the turret, and it is further desirable to have the cylinders and pistons movable with the turret. The cylinder block (Figs. 1, 11, 16 to 19) is provided with a plurality of cylinders 125, which cylinders may be positioned in axial alignment with the chucks 4—4 or, with some types of chucks, the cylinders will be out of axial alignment therewith. The cylinder block 9 may be secured to the end of the turret at 126 and is arranged so as to be adjustable circumferentially thereof. Any suitable means, such as cap screws, may be employed for securing the cylinder block and turret together. The cylinder block and turret may have registering apertures 127—127 for the passage of the piston rods 128, 128, which serve to actuate the chuck, and the aperture 127 in the turret is preferably an elongated slot, so as to permit the circumferential adjustment heretofore mentioned, without binding on the piston rod. The pistons 129—129 are located in the cylinders and, as stated, one piston is provided for each chuck. Fluid, preferably compressed air, is led in through the pipe 10 into the center of the front of the turret, a stuffing box or other swivel connection 130 being provided, so as to permit relative rotation of the turret on the frame. The compressed fluid is led rearwardly to the cylinders through suitable passages or tubes 131, which connect to the valve casings 132, as illustrated in Fig. 17. Each valve 132' is movable so as to admit compressed air to the cylinders and to exhaust the same therefrom. The diagrammatic illustration in Fig. 16 clearly shows the action of the valve. Air enters at 131 and, with the valve 132' positioned as shown in Fig. 16, air is admitted through the passage 133 in front of the piston 129. Air from the rear of the piston is exhausted through the passages 134—135 to the exhaust passage 136. This exhaust passage may be and preferably is led forwardly to the chucks and discharges the exhaust air into the chucks so as to blow out chips or dirt and maintain the same in a clean condition (Figs. 11, 17). As arranged, movement of the piston 129 toward the right as viewed in Figs. 11 and 16 causes the chuck to clamp down on and hold the work article in place, and the air is maintained on the piston throughout that period that the tools are operating upon the work article. As soon as all the operations have been performed on the work article, the valve 132' is rotated so as to cause the air from the front of the piston 129 to exhaust through the passage 133 and into the exhaust passage 136, and compressed air is admitted through the connection 131 and passes past the valve through passages 135—134 to the rear of the piston, so as to force the chuck to be opened.

While the valves 132'—132' may be manually operated, it is preferred to provide automatic means for opening the chucks after the last operation has been performed upon the work articles carried thereby. In the form shown (see Fig. 1) I employ a knock-off abutment 137 on the machine frame and positioned in the path of movement of the valve-actuating arms 138—138. It will be assumed that when the arm extends substantially longitudinally of the machine the compressed air will be acting upon the pistons, so as to maintain the chucks in closed position and the work articles securely gripped. Now, when the turret is indexed the valve actuating arms 138 contact with the knock-off abutment 137 and turn the valves 132' so as to force the chucks to open position so as to release the work articles. It is to be understood that this knock-off abutment 137 is located in such position that the chucks are opened one after another in series after the last operation has been performed on the work article. The work articles may be ejected from the chucks or may fall out into a suitable hopper for receiving the same.

A new article then enters or is placed in the now empty chuck which is in idle position, and the valve actuating handle 138 may then be manually moved so as to again admit air to the cylinder for closing the chuck and holding the same in closed position during that time when the work article is to be acted on by the tools. Instead of manually moving the valve I may employ automatic means, and in the form shown I have indicated a second abutment 139, positioned in the path of the arm 140 carried by each valve and extending oppositely to the arm 138. Now, when the arm 140 reaches the abutment 139, if the valve has not already been manually turned so as to close the chuck, the abutment 139 engaging the arm 140 automatically rotates the valve so as to cause the chuck to be closed. The means just described permits automatic opening and closing of the chucks, and would therefore permit a complete automatic operation of the machine. The abutment 139 and arm 140 likewise form a safety device when the valve is designed to be thrown manually so as to close the chucks, in that, should the operator himself fail to close any chuck, the chuck will be closed automatically and retracted before it reaches the zone where the tools are designed to operate on the work articles. It is in some cases important that the chucks be closed when they reach the operating zone, for otherwise projecting portions of the chucks might be damaged by, or damage, the tools.

The specific type of chucks illustrated in Figs. 1, 11 and 12 is the so called collet type, having the drawback rods 141 connected to the piston rods 128. Each of these chucks includes a chuck body 142 secured to the front of the turret. A plurality of cylindrical bores 143—143 are formed in each chuck body, and these bores converge toward the rear. A cylindrical chuck jaw 144 fits in each of the cylindrical bores and has a suitable bearing thereon. The cylindrical jaws may be held in said bores against rotation by any suitable means, such as the key 145 (Fig. 11). Suitable pads or false jaws 146—146 may be secured to the cylindrical jaws and so fashioned as to properly fit the particular type of work article to be held. The drawrod 141 is arranged to engage the cylindrical jaws 144 so as to positively draw the same rearwardly and force the same forwardly, and for this purpose I have illustrated the flange or head 147 on the forward end of the drawrod 141, this flange fitting suitable abutments on the chuck jaw.

Now, when the drawrod 141 is moved toward the right as viewed in Fig. 11, it will be clear that the cylindrical chuck jaws will be slid rearwardly in the corresponding cylindrical bores and the work article 148 gripped and held in place. The cylindrical jaws and cylindrical bores form adequate smooth bearing surfaces which will withstand hard usage without much wear.

If desired, a positioning spider 149 may be located in the spaces between adjacent chuck jaws and so formed as to support work articles in place and ready to be gripped by the chuck jaws. If desired, automatic ejecting means for the work articles may be located within the chucks, and as one means to this end I show an ejecting plunger 150, slidable in the drawrod 141 and spring pressed outwardly, as shown particularly in Fig. 11. As soon as the chuck jaws are opened the spring pressed plunger 150 serves to forcibly eject the work article, so that the same may drop into the receiving chute or hopper. The chucks illustrated in Figs. 1, 11 and 12 are claimed in my co-pending application, filed April 20, 1926, Serial No. 103,194.

With the type of chuck just described it is desirable that the piston rod 128 be in axial alignment with the chuck. With some types of chucks, however, it is desirable, and even necessary, that the piston rod be out of alignment with the chuck jaws. In Figs. 20 to 23 I have illustrated a serviceable type of chuck, in which it is desirable to have the piston rods out of alignment with the chuck jaws, and it is to permit the use of such chucks that I have provided for the circumferential adjustment of the turret and the cylinders, as previously described. The chuck illustrated in Figs. 20 to 23 is particularly adapted for work of irregular shape, requiring a very substantial chuck jaw opening. In this latter form each chuck body 155 is secured to the front of the turret and includes a plurality of relatively movable jaws 156—156, provided with suitable pads or false jaws for gripping the work article. In this type of chuck I have also embodied means for creating an increased pressure on the work article upon the application of the uniform force or effort of the air piston or other actuating means. In the form shown the chuck jaws are actuated by means of a right and left hand screw 157, journaled in the chuck housing. Obviously, upon rotating the screw 157 in one direction, the chuck jaws will be spread apart, and in rotating the screw in the other direction, the chuck jaws will be closed.

As one means for providing an increased holding force upon the application of a uniform acting force I employ elliptical gears. One elliptical gear 158 is secured on the screw 157, while a second meshing elliptical gear 159 is secured upon a shaft 160 in the chuck body. Now, upon exerting a substantially uniform rotative force on the elliptical gear 159, it will be obvious that the rotative force transmitted to the right and left hand screw 157 may be largely increased, depending upon the design of the elliptical gears. In order to rotate the driving gear 159 I may employ a spur gear 161 on the shaft 160, and a rack 162 slidable on the chuck body may engage the spur gear 161 and serve to rotate the same. The rack 162 will ordinarily be connected to and driven by the piston rod 128, which acts the same as previously described.

The screws 157 may have means, such as the squared head 165, for receiving a wrench for operating the chuck jaws by hand, when that is desirable or necessary. The chuck shown in Figs. 20 to 23 is claimed in my co-pending application, filed October 1, 1926, Serial No. 138,852.

When chucks of the type shown in Figs. 20 to 23 are employed, it is desirable to have considerable movement of the rack 162 and the consequent considerable movement of the pistons 129. In that case the cylinder filler blocks 166 (Fig. 11) would be omitted, so as to permit the greatest stroke of the piston permitted by the cylinder. However, with the collet type of chuck, as illustrated in Fig. 11, a very slight movement of the piston serves to actuate the chuck, and in order to save motive fluid I employ means, such as the filler blocks 166, to reduce the clearance at one end of the cylinders.

From the foregoing description the operation of the preferred form of machine herein illustrated will be readily understood.

After the machine is set up to accommodate the selected class of work, the shift arm 67 (Fig. 1) is moved so as to start the operation of the machine. Work articles are fed to the chucks (one chuck being always in idle position, since there is one more chuck than there are spindles) and the chucks caused to clamp the articles in place. The turret is indexed, as heretofore described in detail, and the locking bar and turret clamping cap set up so as to hold the turret in position rigidly. One of the tool spindles, for example, the drilling spindle, may then act upon the work article in the chuck. After this drilling operation the spindle is, of course, withdrawn and the work article indexed to spindle No. 2, where a turning operation, for example, may be performed on the work article. The turret is then again indexed and a third operation, for example, a threading operation, may be performed on the work article. With but three work spindles, as illustrated, no more operations are then performed on that particular work article, and after the last operation the valve arm 138 is engaged by the knock-off abutment 137, the chuck opened and the finished work article ejected, so that it falls into the hopper or container for the finished articles. The chucks are each loaded as they reach the front of the machine and after the finished articles previously carried thereby have been ejected. Due to the particular formation of the main machine frame, the working zone is at all times clearly visible to the operator while in a seated position, and the frame is cut back so as to permit adequate room for the operator's knees, so that he may sit quite close to the machine for loading the chucks when hand loading is resorted to.

The machine may be made entirely automatic in operation or may be semi-automatic, that is, some of the operations, such as loading the chucks and rotating the valve, may be performed by hand. The feeds and speeds of the tools may be changed within any practicable limits, and adjustments may be made so as to render the machine substantially universal for the class of work and within the limits for which it is adapted.

While the invention has been described in great detail and particular forms illustrated, I wish it understood that the drawings and description are but illustrative of the principles of the invention, and that many changes and embodiments of the invention may be made, all coming within the scope of the appended claims.

I claim:

1. In a chucking machine, a bed, a plurality of tool spindles rotatably carried thereby, a turret, a plurality of chucks carried by said turret, fluid pressure actuating means for said chucks, valves for controlling said fluid pressure actuating means, a cam drum, a cam shaft connected thereto, means actuated by said cam drum for advancing said tool spindles toward said chucks, means actuated by said cam shaft for indexing said turret step by step, and fixed means carried by said bed for acting on said valves to cause said fluid pressure chuck actuating means to open said chucks during and by indexing movements of said turret, one chuck being opened upon each indexing movement of said turret and a second fixed means carried by said bed for actuating said valves to cause said chucks to be closed on an indexing movement of said turret.

2. In a chucking machine, a bed, a plurality of tool spindles rotatably carried thereby, a turret, a plurality of chucks carried by said turret, fluid-pressure actuating means for said chucks, valves for controlling said fluid pressure actuating means, a cam drum, a cam shaft connected thereto, means actuated by said cam drum for advancing said tool spindles toward said chucks, means actuated by said cam shaft for indexing said turret step by step, fixed means carried by said bed for acting on said valves to cause said fluid pressure chuck actuating means to close said chucks one after the other upon and by an indexing movement of said turret, one chuck being closed upon each indexing movement of said turret.

3. In the combination defined in claim 1, said chuck actuating means including fluid actuated pistons connected to said chucks.

4. In a chucking machine, a bed, a turret rotatably mounted on said bed, a plurality of chucks carried by said turret, a plurality of fluid cylinders, one for each said chuck and carried by said turret and movable therewith, means in said cylinders for actuating said chucks on the application of fluid pressure thereto, means for conducting fluid to said cylinders, a valve to control the fluid entering and exhausting from said cylinders, said valves being movable with said turret, each said valve having an arm thereon, and an abutment on said bed to be engaged by said arm for moving each said valve to open each chuck in series upon an indexing movement of said turret, a second abutment on said bed to engage said valve-arm upon an indexing movement of said turret to move said valve to close said chucks one at a time in series.

5. In a chucking machine, a bed, a turret rotatably carried by said bed, chucks carried by said turret, actuating means for said chucks, control means for said actuating means, an abutment to contact with said control means upon an indexing movement of said turret for causing said actuating means to open each chuck in series upon an indexing movement of said turret, and a second abutment to contact with said control means for causing said actuating means to close each said chuck in series upon another indexing movement of said turret.

6. In a chucking machine, a turret, a plurality of work holding chucks carried by said turret, means carried by said turret for operating said chucks, said means being adjustable to fixed positions circumferentially of said turret, whereby the circumferential position of said chucks relatively to said means may be changed.

7. In a chucking machine, a turret, a plurality of work holding chucks carried by said turret, fluid actuated means carried by said turret for actuating each of said chucks, said fluid actuated means for each chuck being adjustable circumferentially relatively to said chucks whereby chucks of different types may be served by the same fluid actuated means.

8. In a chucking machine, a turret, a plurality of work holding chucks carried by said turret, a cylinder block connected to said turret and having a cylinder for each said chuck, fluid actuated means in said cylinders and connected to each said chuck for actuating the same, said cylinder block being movable relatively to said turret whereby chucks of different types may be served by the same fluid actuated means.

9. In a chucking machine, a turret, a plurality of chucks at one end of said turret, a plurality of air cylinders and pistons at the opposite end of said turret and movable therewith, said cylinders being fixed relatively to said turret, connecting means between said pistons and chucks whereby said chucks may be fluid operated, fluid supplying means, and a valve in said fluid supplying means actuated by an indexing movement of said turret for causing said pistons to be moved to release said chucks and a second means for actuating said valve upon an indexing movement of said turret for closing said chucks.

10. In a chucking machine, a turret, a plurality of chucks at one end of said turret, a plurality of air cylinders and pistons at the opposite end of said turret, means connecting said pistons and chucks for permitting the latter to be fluid actuated, means for conducting fluid to said cylinders, and means for discharging exhaust fluid from said cylinders through said chucks for clearing the latter of chips.

11. In a chucking machine, a turret, a plurality of chucks at one end of said turret, a plurality of long cylinders at the opposite end of said turret, pistons in said cylinders, means connecting said chucks and pistons, means for conveying fluid to and from said cylinders for actuating said pistons to operate said chucks, and fillers for reducing the clearance in said relatively long cylinders.

12. In a chucking machine, a turret, a shaft connected to said turret, and means for fixing said shaft in various longitudinally adjusted positions to position said turret longitudinally.

13. In a chucking machine, a bed, a turret, a relatively large bearing for said turret on said bed, a second bearing spaced from said first mentioned bearing and supported on said bed, means for clamping said turret in predetermined circumferential position in one of said bearings, and means at one of said bearings for adjusting the longitudinal position of said turret relatively to said bearings.

14. In a chucking machine, a bed, a bearing on said bed, a turret supported by said bearing, means for clamping said turret in said bearing, a shaft secured to said turret, a bearing for said shaft and supported by said bed, and means for adjusting said turret longitudinally on said bed.

15. In a chucking machine, a bed, a bearing on said bed, a turret carried by said bearing, a turret holding clamp, resilient means for closing said clamp to hold said turret in predetermined position, and means for compressing said resilient means to permit release of said clamp.

16. In a chucking machine, a bed, a bearing on said bed, a turret carried by said bearing, a turret holding clamp, resilient means for closing said clamp to hold said turret in predetermined position, and means for positively releasing said clamp to permit said turret to be moved in said bearing.

17. In a chucking machine, a bed, a bearing on said bed, a turret carried by said bearing, a turret holding clamp, resilient means for closing said clamp to hold said turret in predetermined position, means for positively releasing said clamp, and resilient means for opening the latter after it has been released whereby said turret may be indexed.

18. In a chucking machine, a bed, a bearing carried by said bed, a turret carried by said bearing, a turret clamping cap for clamping said turret in predetermined position, a shaft rotatably carried by said bed, a cam on said shaft, means connecting said cam and turret clamping cap, said cam serving to release said cap, and means independent of said cam for closing said cap.

19. In the combination defined in claim 18, and resilient means for opening said cap after the same has been released.

20. In a chucking machine, a bed, a bearing carried by said bed, a turret carried by said bearing, a turret holding clamping cap to engage said turret, spaced apart means for supporting said cap at one side, and a single means at another side of said cap for drawing the same down on to said turret to clamp the same in position.

21. In a chucking machine, a bed, a bearing carried by said bed, a turret carried in said bearing, a turret holding clamping cap to engage said turret for positioning the same, resilient means for forcing said clamp out of engagement with said turret, resilient means for forcing said clamp into engagement with said turret, and means controlling said two resilient means whereby each may act.

22. In a chucking machine, a bed, a bearing carried by said bed, a turret carried by said bearing, a turret holding clamping clamp to engage said turret for positioning the same, means for drawing said cap into engagement with said turret, a lever to engage said means, spring pressed means for actuating said lever in one direction, positively acting means for moving said lever in the opposite direction, and resilient means for moving said cap toward open position.

23. In a chucking machine, a bed, a turret on said bed, a bearing for said turret, said bearing being divided on a plane inclined at a substantial angle downwardly toward the front of the chucking machine, and means rearwardly of said turret for clamping said bearing on said turret whereby the same may be held against movement.

24. In a chucking machine, a bed, a turret carried by said bed and rotatable thereon, a Geneva wheel for indexing said turret, a Geneva arm for moving said Geneva wheel and turret, and means for moving said Geneva arm more slowly when it engages said wheel near the centre, said means including an eccentrically mounted toothed gear.

25. In the combination defined in claim 24, said toothed gear being an elliptical gear, and a second elliptical gear meshing therewith.

26. In a chucking machine, a plurality of tool spindles, a main drive shaft, an intermediate drive shaft driven by said main drive shaft, a central drive shaft driven by said intermediate shaft, said central drive shaft being formed in two parts relatively movable, at least one of said spindles being driven by said central drive shaft, and one of said spindles being driven by another of said shafts.

27. In a chucking machine, a plurality of tool spindles, a main drive shaft, a central drive shaft driven by said main drive shaft, said central drive shaft being formed in two relatively rotatable parts, means on each of said parts of said central drive shaft for driving said spindles.

28. In a chucking machine, a plurality of tool spindles, a main drive shaft, a second shaft driven by said main drive shaft and having a spiral gear thereon, one of said spindles having a spiral gear in mesh with said first mentioned spiral gear, said spiral gears being directed to urge said tool spindle away from the work, and means for driving the other tool spindles.

29. In a chucking machine, a plurality of tool spindles, a main drive shaft, an intermediate shaft driven thereby, a central drive shaft driven by said intermediate shaft, one of said spindles having two gears thereon, a gear on said intermediate shaft meshing with one of said gears on said spindle, a gear on said central drive shaft and meshing with the other of said gears on said spindle, and clutch means for causing both of said gears on said spindle to be driven at different times.

30. In a chucking machine, a plurality of tool spindles, means for driving said spindles, said means for one of said spindles including spiral gears with the spirals directed to constantly urge said gear on said spindle away from the work.

31. In a chucking machine, a plurality of tool spindles, means for driving said spindles, said means including two shafts rotatable relatively to each other and arranged in axial alinement with each other, one of said shafts being geared to one spindle and the other of said shafts being geared to another spindle.

32. In a chucking machine, a plurality of tool spindles, means for driving said spindles including two shafts arranged end to end in axial alinement with each other, one of said shafts being journaled on the other.

33. In a chucking machine, a plurality of tool spindles, a square cam yoke guide bar, cam yokes guided on opposite sides of said guide bar for moving said spindles axially.

34. In a chucking machine, a plurality of tool spindles, a square cam yoke guide bar, a cam yoke having an L-shaped portion guided on said guide bar for moving one of said spindles axially.

35. In a chucking machine, a plurality of tool spindles, a bearing housing therefor, means for driving said tool spindles and arranged within said housing, said means including two shafts arranged in axial alinement with each other and rotatable relatively to each other, said two shafts projecting through said housing and change speed gears on the projecting ends of said shafts.

36. In a chucking machine, a plurality of tool spindles, a main drive shaft, an intermediate shaft driven thereby, a central drive shaft formed in relatively rotatable parts and driven by said intermediate shaft, gears carried by said spindles and by said central drive shaft and said intermediate shaft, two of said spindles being driven by gears on said central drive shaft, one of said spindles being driven by a gear on said central drive shaft and being driven in the opposite direction by a gear on said intermediate shaft.

37. In the combination defined in claim 36, a cam yoke guide bar and cam yokes guided on said bar and arranged to advance some of said spindles axially.

38. In a chucking machine, a plurality of tool spindles, a housing for supporting said spindles, means within said housing for rotating said spindles, means within said housing for moving one of said spindles axially, one of said spindles projecting rearwardly through said housing, and means on the outside of said housing for engaging the projecting end of said spindle for moving the same axially.

39. In a chucking machine, a plurality of tool spindles, a housing for supporting the same, means for rotating said spindles and arranged within said housing, one of said spindles being arranged to rotate in two directions, a clutch within said housing for determining the direction of rotation of said spindle, a cam drum arranged adjacent said housing, a cam on said drum for actuating said clutch and a second cam on said drum for moving said last mentioned tool spindle axially, said last mentioned cam connection being arranged exteriorly of said housing, and cams carried by said drum for moving the other spindles axially.

40. In a chucking machine, a plurality of tool spindles, an angular cam yoke guide bar arranged between two of said spindles, cam yokes connected to said spindles and guided and slidable on said guide bar, a cam drum adjacent said spindles and having cams thereon for engaging and moving said yokes to move said spindles axially, and means for rotating said spindles.

41. In a chucking machine, a plurality of tool spindles, means for rotating same, a turret, a plurality of chucks fixedly carried by said turret, means for automatically actuating said chucks, cam means for advancing said chucks and spindles relatively to each other to present work carried by said chucks to said spindles, a cam shaft on said cam means, and means actuated by said shaft for indexing said turret to present said chucks to said spindles in series.

42. In a chucking machine, a plurality of tool spindles, means for rotating the same, a cam drum positioned adjacent said spindles, cams on said drums and means connecting said cams with said spindles whereby the latter may be moved axially, a turret, a plurality of chucks carried by said turret, some of said chucks being normally in line with said spindles, automatically actuated means for actuating said chucks in one direction, a cam shaft movable with said drum, means actuated by said shaft for indexing said turret, said chucks being automatically actuated by said means during an indexing movement of said turret.

43. In a chucking machine, a plurality of tool spindles, means for rotating the same, a turret, a plurality of chucks with fluid actuating means carried by said turret, a cam drum for advancing said chucks and spindles to each other, means acting in unison with said cam drum for indexing said turret, and means for causing said cam drum to move at a higher rate of speed during the indexing movement of said turret than when the turret is stationary.

44. In a chucking machine, a bed, a turret supported thereby, a plurality of chucks carried by said turret, a plurality of fluid pressure actuated devices non-rotatably carried by said turret, and means for adjusting all of said fluid pressure actuated devices circumferentially relatively to said turret.

45. In a chucking machine, a bed, a turret supported thereon, a plurality of chucks carried by said turret, a cylinder block fixedly mounted relatively to said turret and having a plurality of cylinders, one for each said chuck, and means for adjusting said cylinder block and cylinders circumferentially relatively to said turret.

46. In a chucking machine, a bed, a turret supported thereon, a plurality of chucks fixedly mounted relatively to said turret, a plurality of fluid pressure cylinders non-rotatably mounted relatively to said turret, pistons in said cylinders and connected to said chucks, an individual fluid pressure control valve for each said cylinder and movable therewith, an abutment fixedly mounted relatively to said bed for actuating said valves in one direction in series, and a second abutment fixedly mounted relatively to said bed for actuating said valves in series in the opposite direction.

47. In a chucking machine, a bed, a turret supported thereby, a plurality of chucks on said turret, means for indexing said turret step by step, a rearwardly extending shaft secured to said turret, and means for positioning said shaft relatively to said bed and adjusting said shaft thereon for positioning said turret longitudinally of said bed.

48. In a chucking machine, a turret, a plurality of chucks carried thereby, air cylinders for actuating said chucks, valve means for controlling the inlet and exhaust of air to said cylinders, and means for conducting exhaust air from said cylinders to said chucks for blowing chips therefrom.

49. In a machine of the character described, a bed, a turret supported thereon, a shaft secured to said turret, means for adjusting said shaft longitudinally relatively to said bed and securing said shaft in adjusted positions, whereby the position of said turret may be adjusted and fixed longitudinally of said bed.

50. In a machine of the character described, a turret, a Geneva wheel for indexing said turret, a Geneva arm for moving said Geneva wheel, an eccentrically mounted toothed gear movable with said arm, and a meshing toothed member meshing with said eccentrically mounted gear, said gears being positioned to cause said Geneva arm to move more slowly when the latter engages said Geneva wheel near the center.

51. In a machine of the character described, a turret, means for indexing the same, a turret clamp, a bar for drawing said clamp into clamping position, a lever for acting on said bar, a spring for constantly urging said lever to draw said bar in a turret clamping direction, and means for positively moving said lever to release said turret clamping bar and simultaneously compress said spring.

52. In a metal working machine, a bed, a turret journaled in said bed, a shaft carried centrally by said turret and extending from one end thereof, and coacting abutment means on said shaft and frame and adjustable for holding said turret in various adjusted positions longitudinally of its axis.

53. In a metal working machine, a bed, a turret journaled in said bed, a shaft carried by said turret and extending rearwardly therefrom, and coacting abutment means on said shaft and bed for positioning said turret in both directions longitudinally of its axis.

54. In a metal working machine, a bed, an indexible member journaled in said bed, means for indexing said indexible member, said means including a driving and a driven shaft on axes substantially parallel to the axis of said indexible member, eccentrically mounted meshing gears carried by said shafts, and means actuated by the gear on said driven shaft for indexing said indexible member and means controlled by said driving shaft for holding said indexible member in indexible position.

55. In a metal working machine, a bed, an indexible member journaled therein, a Geneva wheel carried by said indexible member, a Geneva arm for engaging said Geneva wheel for indexing said indexible member step by step, and means including meshing eccentrically mounted gears on shafts substantially parallel to the axis of said indexible member for driving said Geneva arm with a variable motion.

56. In a metal working machine, a bed, an indexible turret member journaled in said bed, a Geneva wheel carried by said indexible member, a Geneva arm for engaging said Geneva wheel for indexing said indexible member step by step, a pair of shafts mounted substantially parallel to the axis of the indexible member, and meshing gears each having teeth at different distances from the axis thereof, said meshing gears serving to drive said Geneva arm with a variable motion.

57. In a chucking machine, a frame having a forward bearing, an indexible turret journaled in said forward bearing, said frame having a rear bearing, a part of said turret being journaled in said rear bearing, a plurality of chucking devices for said turret, fluid pressure actuated means for actuating said chucking devices, actuating rods extending from said fluid pressure actuated devices to said chucking devices and being located within said forward bearing, said fluid pressure actuated devices being located between said forward bearing and said rear bearing, means for conducting pressure fluid to said fluid pressure actuated devices from one end of said turret, and means for controlling the flow of pressure fluid to and from said fluid pressure actuated devices.

58. In a chucking machine, a frame having a forward bearing and a rear bearing spaced from said forward bearing, an indexible turret journaled in said forward and rear bearings, chuck devices for said turret, fluid pressure actuated means for actuating said chuck devices and including actuating rods between said chuck devices and said fluid pressure actuated devices, said fluid pressure actuated devices being located forwardly of said rear bearing and said actuating rods extending forwardly to said chuck devices and within said forward bearing.

59. In a chucking machine, a frame having a forward bearing, an indexible turret journaled in said forward bearing, chuck devices for said turret, fluid pressure actuated devices for actuating said chuck devices and including actuating rods extending from said chuck devices to said fluid pressure actuated devices, said actuating rods being located within said forward bearing, and a rear bearing on said frame for sustaining said fluid pressure actuated devices, rearwardly thereof, means for conducting pressure fluid to said pressure fluid actuated devices and located centrally axially of said turret, and means for controlling the flow of pressure fluid to and from said fluid pressure actuated devices.

60. In a chucking machine, a frame having a forward bearing, an indexible turret journaled in said bearing, chuck devices indexible with said turret, chuck actuating rods extending from said chuck devices rearwardly therefrom and being confined within said forward bearing, a rear bearing on said frame, means secured to said turret and sustained in said rear bearing, fluid pressure actuated devices in part supported by said means, and a conductor for pressure fluid located on the axis of said turret together with passage means for conducting pressure fluid from said conductor to said fluid pressure actuated devices.

61. In a chucking machine, a frame having a forward bearing, an indexible turret journaled in said bearing, chuck devices indexible with said turret, actuating rods extending from said chuck devices rearwardly and being confined within said forward bearing, a shaft secured to said turret and extending rearwardly, a rear bearing on said frame for said shaft, fluid pressure actuated devices connected to and sustained in part at least by said shaft, and means for conducting pressure fluid to said pressure fluid actuated devices.

62. In a chucking machine, a frame having a bearing, an indexible turret journaled in said bearing, chuck devices indexible with said turret, fluid pressure actuated means for actuating said chucks, a shaft secured to said turret and extending axially from one end thereof, and means for adjustably holding said shaft in any longitudinal position to position said turret longitudinally relatively to said frame.

63. In a chucking machine, a frame having a forward bearing, an indexible turret journaled in said bearing, a plurality of chuck devices indexible with said turret, cylinders and pistons one for each chuck device and located rearwardly of said forward bearing, chuck actuating rods connecting said pistons and said chuck devices, said chuck actuating rods extending from said pistons forwardly within the confines of said forward bearing, a rear bearing on said frame and means journaled in said rear bearing for sustaining said cylinders, means for conducting pressure fluid to and from said cylinders, and valve means for controlling the flow of fluid through said conducting means.

64. In a chucking machine, a frame, a plurality of tool holders carried by said frame, a turret bearing on said frame, a turret journaled in said bearing, a plurality of chucking devices indexible with said turret, said chucking devices and tool holders being rotatable relatively to each other, fluid pressure actuated means for actuating said chucks, a second bearing on said frame adjacent said fluid pressure actuated devices, and means connected to said turret and journaled in said second bearing for assisting in supporting said turret.

65. In a chucking machine, a frame having a bearing, an indexible turret carried by said bearing, a plurality of chucking devices fixedly secured to the front end of said turret, a bracket member fixedly secured to the rear end of said turret, a plurality of cylinders rigid with said bracket, there being one cylinder for each chucking device, pistons in said cylinders, chuck actuating rods connecting said pistons and said chucking devices, and means for controlling the flow of pressure fluid to and from said cylinders.

66. In a chucking machine, a frame having a forward bearing, an indexible turret mounted in said bearing, a rearward extension on said turret, a rear bearing on said frame for supporting said rearward extension, a plurality of chucking devices rigidly secured to the front end of said turret, a plurality of cylinders rigidly supported by said rearward extension, pistons in said cylinders, and chuck actuating rods extending from said pistons to said chuck devices, and means for controlling the flow of pressure fluid to and from said cylinders.

67. In a metal working machine, a bed, means carrying a plurality of tool holders, means carrying a plurality of work holders, said work holders and tool holders being rotatable relatively to each other, means for indexing said plurality of work holders relatively to the tool holders, fluid pressure actuated means for actuating said work holders, valve means for controlling the flow of pressure fluid to and from said fluid pressure actuated means, means carried by said bed to be engaged by said valve means upon an indexing movement of said work holders for opening a chuck, and means carried by said bed to be engaged by said valve means upon an indexing movement of said work holders for closing a chuck.

68. In a metal working machine, a bed, a plurality of tool holders carried thereby, an indexible turret, a plurality of chuck devices indexible with said turret, fluid pressure actuated means for said chucks, valve means for controlling the flow of pressure fluid to and from said fluid pressure actuated means for opening and closing the chucks, means for indexing said turret, means carried by said bed to be engaged by said valve means during an indexing movement of said turret to open a chuck, and means carried by said bed to be engaged by said valve means for closing the same chuck upon another indexing movement of said turret.

69. In a metal working machine, a spindle head, a plurality of rotatable spindles therein, cam yokes for said spindles having means to be engaged by a cam for feeding said spindles, a cam yoke guide bar, said cam yokes having parts fitting said guide bar for guiding the same in their longitudinal movement with said spindles.

70. In a metal working machine, a spindle head, a rotatable spindle, a yoke member for feeding said spindle, a yoke guide bar fixedly carried by said spindle head, said yoke and yoke guide being interengaged whereby said yoke will be guided by said guide bar during the movement of said yoke with said spindle.

71. In a metal working machine, a frame having front and rear bearings, a turret having parts journaled in said front and rear bearings, chucks carried by said turret adjacent said front bearing, fluid pressure actuated devices carried by said turret adjacent said rear bearing, and means connecting said fluid pressure actuated devices and said chucks whereby the latter may be actuated.

72. In a metal working machine, a frame having front and rear bearings, a turret indexibly mounted in said front and rear bearings, a plurality of chucks, and a plurality of fluid pressure actuated devices for actuating said chucks, all being rigidly and unitarily carried by said turret and movable therewith.

73. In a metal working machine, a frame having a bearing, a turret indexibly mounted in said bearing, chucks rigidly carried by said turret, fluid pressure actuated devices rigidly carried by said turret, means connecting said fluid pressure actuated devices and chucks whereby the latter may be actuated, said chucks and fluid pressure actuated devices being carried by said turret forwardly of said bearing.

74. In a metal working machine, a frame having an enlarged forward bearing, a turret having a part indexibly mounted therein, chucks indexible with said turret, said turret having a smaller portion extending rearwardly from said forward bearing, a rear bearing on said frame, said smaller portion of said turret having a bearing device mounted in said rear bearing, fluid pressure actuated devices interposed between said forward and rear bearings, and means connecting said fluid pressure actuated devices and said chucks and lying within said forward bearing for actuating said chucks.

75. In a chucking machine, an indexible turret, a plurality of chucks fixedly secured to the front end of said turret, a unitary cylinder block having a plurality of cylinders therein one for each chuck, said cylinder block having a flange thereon rigidly secured to the rear end of said turret, a piston in each said cylinder and connected to a chuck, a rotatable tool spindle, and means for advancing said tool spindle, and chucks relatively to each other.

76. In a chucking machine, an indexible turret, a unitary cylinder block having a plurality of cylinders therein, said cylinder block being rigidly secured at one end of said turret, a piston in each said cylinder, a chuck for each said piston and connected thereto to be actuated by the latter, a tool holder, means for rotating said tool holder and chucks relatively to each other, and means for advancing said tool holder and chucks relatively to each other.

77. In a chucking machine, an indexible turret, a unitary cylinder block having a plurality of cylinders therein, said cylinder block having an integral marginal flange thereon rigidly secured to one end of said turret, a piston in each said cylinder, a chuck for each said piston and connected thereto to be actuated by the latter, a tool holder, means for rotating said tool holder and chucks relatively to each other, and means for advancing said tool holder and chucks relatively to each other.

78. In a chucking machine, an indexible turret, a group of chucks arranged equidistant from a common center and from each other in a circular path, a unitary cylinder block having a plurality of cylinders therein one for each said chuck, said cylinder block being rigidly secured to said turret, pistons in said cylinders, and connections from each said piston to its corresponding chuck for actuating the latter, a rotatable tool spindle opposite one of said chucks, means for indexing said chucks and tool spindle relatively to each other to serially bring each chuck opposite said tool spindle, and means for advancing said chucks and tool spindle relatively to each other.

79. In a chucking machine, a plurality of rotatable tool spindles, an indexibly mounted turret, a plurality of work chucks fixedly carried by the front end of said turret, means for advancing and retracting said tool spindles and chucks relatively to each other, a plurality of fluid pressure devices fixedly carried by the rear end of said turret and articulated with said chucks for actuating the latter, and means for controlling the flow of pressure fluid for actuating said fluid pressure devices.

80. In a chucking machine, a plurality of rotatable tool spindles, an indexibly mounted turret, a plurality of work chucks fixedly carried by the front end of said turret, means for advancing and retracting said tool spindles and chucks relatively to each other, a plurality of fluid pressure devices fixedly carried by the rear end of said turret and articulated with said chucks for actuating the latter, and valve means located closely adjacent said fluid pressure devices and at the rear of said turret for controlling the flow of fluid for actuating said fluid pressure devices.

81. In a chucking machine, a plurality of rotatable tool spindles, an indexibly mounted turret, a plurality of work chucks fixedly carried by the front end of said turret, means for advancing and retracting said tool spindles and chucks relatively to each other, a unitary cylinder block secured to the rear end of said turret and comprising a plurality of cylinders, pistons in said cylinders, means for connecting each of said pistons to a chuck for actuating the latter, and valve means for controlling the flow of pressure fluid for actuating said pistons.

82. In a chucking machine, a plurality of rotatable tool spindles, an indexibly mounted turret, a plurality of work chucks fixedly carried by the front end of said turret, means for advancing and retracting said tool spindles and chucks relatively to each other, a plurality of fluid pressure devices fixedly carried by the rear end of said turret and articulated with said chucks for actuating the latter, a valve for each of said fluid pressure devices and located adjacent the latter, a fixed valve tripping stop in the path of movement of a part of each said valve and adapted to be engaged by the latter upon and by an indexing movement of said turret for tripping all of said valves in series.

83. In a chucking machine, a frame, a plurality of rotatable tool spindles, means for advancing and retracting said tool spindles, an indexible turret, a plurality of work carrying chucks and cylinders rigidly carried by said turret, pistons in said cylinders, means connecting said pistons and chucks for actuating the latter, means for indexing said turret, and screw means for moving said turret to various positions of fixed adjustment longitudinally of said frame for the purpose described.

84. In a chucking machine, a frame, a plurality of horizontally movable rotatable tool spindles, means for feeding the same horizontally, a horizontally mounted indexible turret having a plurality of work carrying chucks fixedly mounted at the front thereof, a plurality of fluid pressure cylinders fixedly mounted at the rear thereof, pistons in said cylinders and connected to said chucks for actuating the latter, valve means for controlling the flow of pressure fluid for said cylinders, and means for holding said turret in various fixed positions of adjustment longitudinally of said frame.

85. In a chucking machine, a frame, a rotatable spindle mounted therein, means for feeding said spindle, an indexible turret, a plurality of chucks carried by said turret, said turret being shiftable longitudinally to various positions on said frame, and manually operable screw means for shifting said turret to said various positions for the purpose described.

86. In a chucking machine, a frame, an indexible turret mounted thereon, a plurality of cylinders fixedly carried with said turret, pistons in said cylinders, a chuck for each said cylinder and connected to said pistons to be actuated thereby, a valve means for each said cylinder for controlling the flow of pressure fluid thereto, a valve tripping abutment fixedly carried with said frame and positioned in the path of a part of each said valve means whereby upon each indexing movement of said turret one of said valve means will be actuated by said valve tripping abutment for the purpose described.

ROBERT S. BROWN.